United States Patent
Jeong et al.

(10) Patent No.: US 10,127,278 B2
(45) Date of Patent: *Nov. 13, 2018

(54) PROCESSING DATABASE QUERIES USING FORMAT CONVERSION

(71) Applicant: SAP SE, Walldorf (DE)

(72) Inventors: Chanho Jeong, Seoul (KR); Sangyong Hwang, Leimen (DE); Sang Kyun Cha, Seoul (KR); Sung Heun Wi, Gyeonggi-do (KR)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/140,794

(22) Filed: Apr. 28, 2016

(65) Prior Publication Data

US 2016/0292227 A1 Oct. 6, 2016

Related U.S. Application Data

(63) Continuation of application No. 14/508,524, filed on Oct. 7, 2014, now Pat. No. 9,361,340, which is a (Continued)

(51) Int. Cl.
*G06F 17/30* (2006.01)

(52) U.S. Cl.
CPC ........ *G06F 17/30463* (2013.01); *G06F 17/30* (2013.01); *G06F 17/30286* (2013.01);
(Continued)

(58) Field of Classification Search
CPC ............... G06F 17/30; G06F 17/30463; G06F 17/30286; G06F 17/30492; G06F 11/28
See application file for complete search history.

(56) References Cited

U.S. PATENT DOCUMENTS 6,016,497 A * 1/2000 Suver ................ G06F 17/30595
8,301,620 B2 * 10/2012 Sthanikam ........ G06F 17/30935
707/713
(Continued)

OTHER PUBLICATIONS

Ailamaki, Anastassia et al. "Weaving Relations for Cache Performance." 15-823 Hot Topics in DB Systems. *VLDB 2001*. Rome, Italy. Web. Jun. 27, 2014.
(Continued)

*Primary Examiner* — Dung K Chau
(74) *Attorney, Agent, or Firm* — Mintz Levin Cohn Ferris Glovsky and Popeo, P.C.

(57) ABSTRACT

Devices, methods and systems for processing database queries formatted differently than the database storage model being queried are disclosed. Processing database queries independent of the storage model of the queried database may be performed by receiving a query for one or more data items stored in a database, determining whether to use at least one query operator that uses data having a format different from the storage model format of at least one of one or more data items stored in the database and converting the format of the data used by the at least one query operator to a format that matches the storage model format of at least one of one or more data items stored in the database. Related systems, methods, and articles of manufacture are also described.

19 Claims, 6 Drawing Sheets

Related U.S. Application Data continuation of application No. 12/982,673, filed on Dec. 30, 2010, now Pat. No. 8,880,508.

(52) U.S. Cl.
CPC .. *G06F 17/30471* (2013.01); *G06F 17/30492* (2013.01); *G06F 17/30569* (2013.01)

(56) References Cited

U.S. PATENT DOCUMENTS

| | | | |
|---|---|---|---|
| 2005/0229158 A1* | 10/2005 | Thusoo | G06F 17/2205 717/115 |
| 2006/0020582 A1* | 1/2006 | Dettinger | G06F 17/30554 |
| 2006/0230016 A1* | 10/2006 | Cunningham | G06F 17/30474 |
| 2009/0006399 A1* | 1/2009 | Raman | G06F 17/30498 |
| 2009/0030883 A1* | 1/2009 | Das | G06F 17/30312 |
| 2010/0057796 A1 | 3/2010 | Brown et al. | |
| 2010/0312756 A1* | 12/2010 | Zhang | G06F 17/30938 707/693 |
| 2011/0016157 A1* | 1/2011 | Bear | G06F 17/30312 707/804 |
| 2011/0029569 A1* | 2/2011 | Ganesh | G06F 17/30595 707/796 |
| 2011/0219020 A1* | 9/2011 | Oks | G06F 17/30 707/769 |
| 2011/0231389 A1* | 9/2011 | Surna | G06F 17/30492 707/718 |

OTHER PUBLICATIONS

Nanda, Arup. "Compressing Columns." *Oracle Technology Network. Oracle Magazine.* Nov. 13, 2010. *WayBack Machine Internet Archive.* Web. Jun. 27, 2014.

* cited by examiner

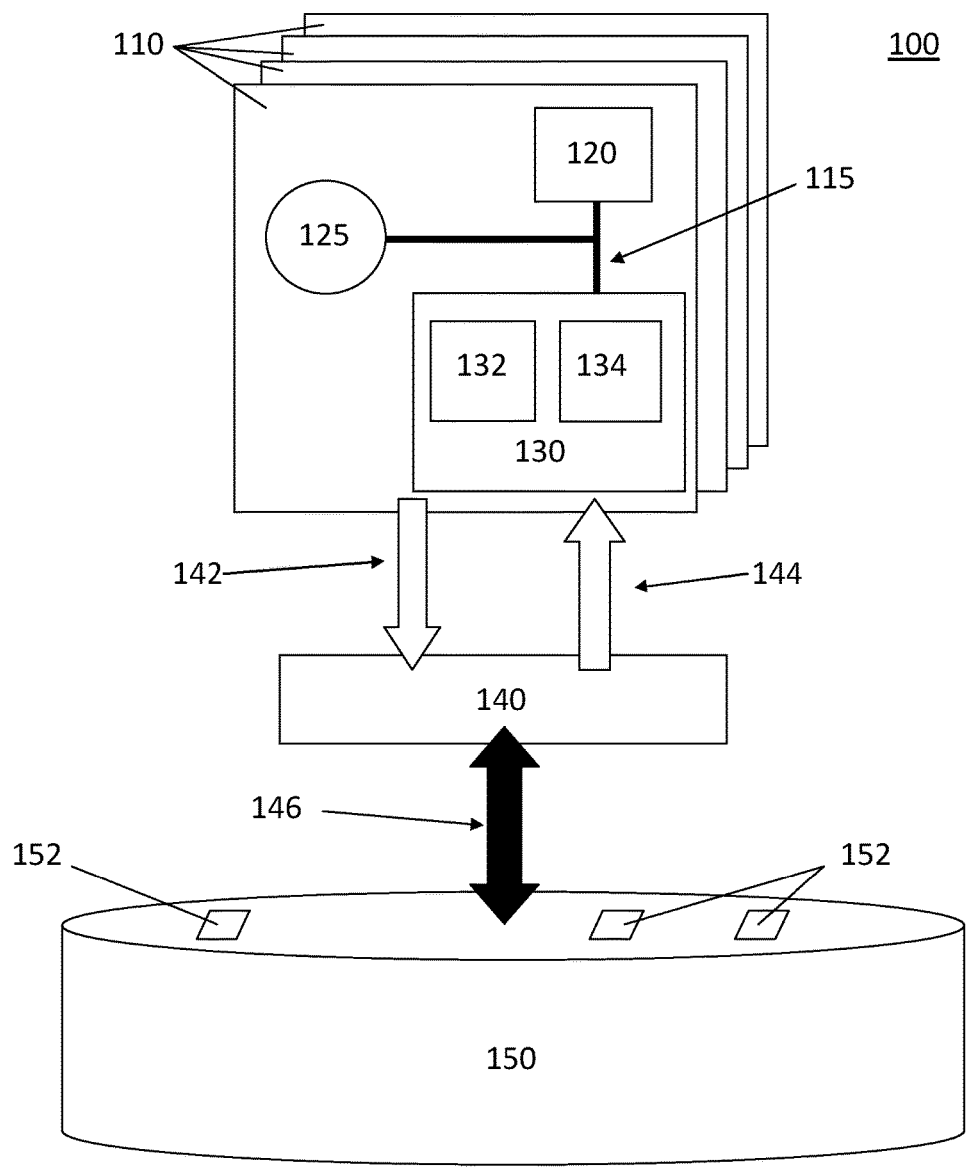

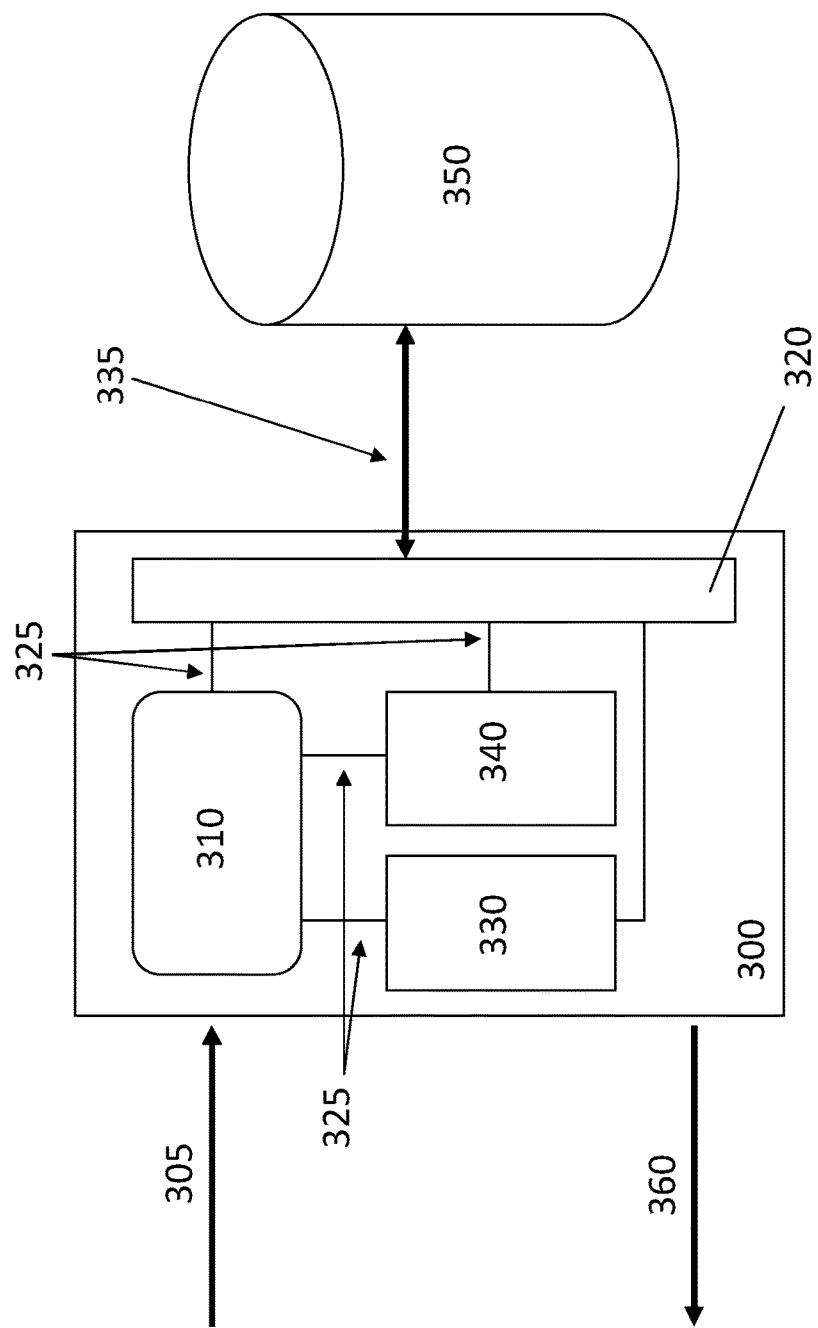

PROCESSING DATABASE QUERIES USING FORMAT CONVERSION

CROSS REFERENCE TO RELATED APPLICATIONS

This application is a continuation application of U.S. patent application Ser. No. 14/508,524, filed Oct. 7, 2014, entitled "Processing Database Queries Using Format Conversion," which is a continuation of U.S. patent application Ser. No. 12/982,673, filed Dec. 30, 2010, entitled "Processing Database Queries Using Format Conversion," the contents both of which are hereby incorporated by reference in their entirety.

FIELD

The subject matter described herein relates to processing database queries.

BACKGROUND

A database is an electronic filing system that stores data in a structured way. The primary storage structure in a database is a table. A database may contain multiple tables and each table may hold information of a specific type. Database tables store and organize data in horizontal rows and vertical columns. Rows typically correspond to real-world entities or relationships that represent individual records in a table. Columns may denote specific attributes of those entities or relationships, such as "name," "address" or "phone number." For example, Company X may have a database containing a "customer" table listing the names, addresses and phone numbers of its customers. Each row may represent a single customer and the columns may represent each customer's name, address and phone number.

Databases are generally stored in computer memory that is one-dimensional. Two-dimensional database tables must therefore be mapped onto a one-dimensional data structure to be stored within a database. One mapping approach involves storing a table in a database row-by-row (i.e., a row-oriented storage model). This approach keeps information about a single entity together. For example, row-by-row storage may store all information about a first customer first, then all information about a second customer and so on. Alternatively, a table may be stored in a database column-by-column (i.e., a column-oriented storage model). This approach keeps like attributes of different entities together. For example, column-by-column storage may store all customer names first, then all customer addresses and so on.

Data must generally be accessed from a table in the same manner that it was stored. That is, conventional computer storage techniques require dedicated query operators that can access specific types of storage models. For example, row query operators are used to process data stored in a database in row-formatted storage models and column query operators are used to process data stored in column-formatted storage models. Choosing which storage model to use thus often depends on how data will be used. Row-oriented storage models are commonly well-suited for transactional queries, while column-oriented storage models are generally well-suited for analytical queries. Accordingly, conventional query processing schemes are tightly bound to the underlying storage model of the database being queried.

In reality, however, a database having certain data stored in a column-formatted storage model may be asked to handle a transactional query relating to that data or a database having certain data stored in a row-formatted storage model may be asked to handle an analytical query relating to that data. For example, a database having data stored in a row-formatted storage model may receive a mixed set of queries requiring transactional and analytical processing of that data. Conventional mechanisms for handling a mixed set of queries involve altering the structure or format of the database storage model of the queried data to a hybrid configuration of row- and column-formatted storage models. For example, Partition Attributes Across (PAX) groups together all values of each column within each page and Oracle Exadata groups column values within each compression unit. A single hybrid storage model advantageously provides row- and column-formatted storage models and may give better transactional performance than pure column-formatted storage and better analytical performance than pure row-formatted storage.

SUMMARY

In some of the implementations described herein, a computer program product may be tangibly embodied in a non-transitory machine-readable medium and contain instructions to cause a data processing apparatus to perform operations that include receiving a query for one or more data items stored in a database, determining whether to use at least one query operator that uses data having a different format than the format of the storage model of the one or more data items stored in the database and converting the format of the data used by the at least one query operator to a format that matches the storage model format of the database. Some implementations may further include generating a plurality of query plans, selecting the most efficient query plan of the plurality of query plans and executing the query using the most efficient query plan.

In some related implementations of the present disclosure, a computer-implemented method may include receiving a query for one or more data items stored in a database, determining whether to use at least one query operator that uses data having a different format than the format of the storage model of the one or more data items stored in the database and converting the format of the data used by the at least one query operator to a format that matches the storage model format of the database.

Some implementations may be directed to a system having a processor and a memory configured to perform a method that includes receiving a query for one or more data items stored in a database and generating a plurality of query plans. In some aspects, the generating may include identifying at least one query operator that uses data having a format different from the storage model format of at least one of the one or more data items stored in the database and/or converting the format of the data used by the at least one query operator to a format that matches the storage model format of the at least one of the one or more data items stored in the database. Some embodiments may further involve selecting the most efficient query plan of the plurality of query plans and executing the query using the most efficient query plan.

Articles are also described herein that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more operations described herein.

It should be noted that, while the descriptions of specific implementations of the current subject matter may discuss delivery of enterprise resource planning software to one or more organizations, in some implementations via a multi-tenant system, the current subject matter is applicable to other types of software and data services access as well. The scope of the subject matter claimed below therefore should not be limited except by the actual language of the claims.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 shows a system for processing a database query according to some implementations of the present disclosure.

FIG. 3 shows a database management system according to some implementations of the present disclosure.

Like reference symbols in the various drawings indicate like elements.

DETAILED DESCRIPTION

Figure 2A:
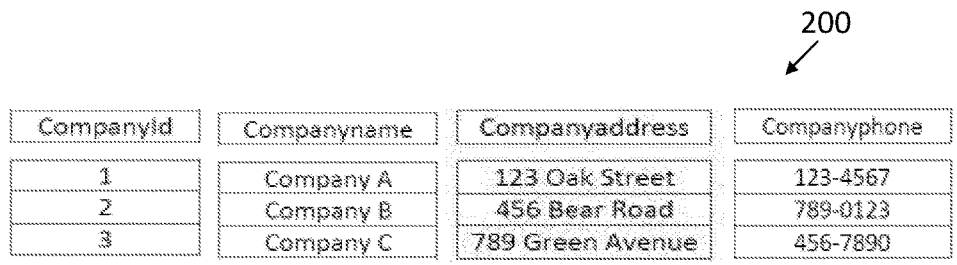
FIG. 2a shows an example of data stored in a column-formatted storage model according to some implementations of the present disclosure.

The subject matter described herein discloses processing a query to a database without changing the format of the database storage model of the data being processed. Embodiments of the systems, methods and products of the present disclosure may implement one or more format converters that convert row-format data to column-format data and/or column-format data to row-format data. Some embodiments may be configured to establish an optimized query plan associated with a query that contains a combination of the most efficient query operators chosen from among all possible query operator combinations providing the same result. In some implementations, the subject matter of the present disclosure may eliminate the requirement that a query contain query operators having the same data format as the database storage model of the data being processed pursuant to the query. Unlike conventional querying schemes, implementations of the present disclosure may allow users to maintain a single database for processing queries on both row-formatted storage models and column-formatted storage models.

FIG. 1 shows a basic configuration of a system 100 for querying a database 150 according to implementations of the present disclosure. System 100 may include a single computer 110 or a plurality of computers 110 in communication over a communication mechanism, such as a bus, a local area network, intranet and/or the Internet. A computer 110 may have a central processing unit (CPU) 120, a clock 125, a memory 130 and a bus 115. Memory 130 may include volatile main memory 132 (e.g., random access memory, or RAM) and non-volatile memory 134 (e.g., read-only memory, or ROM).

Database 150 of system 100 may be configured as any suitable database structure, including without limitation, a network, relational, hierarchical, multi-dimensional or object database. Database 150 may be located within main memory 132 (e.g., in the RAM) and/or within non-volatile memory 134 (e.g., on a persistent hard disk), depending on the embodiment. In some aspects of the present disclosure, database 150 may be configured to employ the resources of both the main memory 132 and the non-volatile memory 134. A computer 110 may contain one database 150 or, in some embodiments, a plurality of databases 150. Database 150 may also be located remote from computer 110, such as on a central database server in an enterprise resource planning (ERP) system or on a web server. Moreover, the database 150 may be implemented as an in-memory database. Rather than use disk-based persistent storage, an in-memory database keeps most, if not all, of the relevant database data items in main memory, such as random access memory (RAM), dynamic random access memory (DRAM), static random access memory, and the like. Moreover, database 150 may be implemented with one or more storage models, including without limitation, row storage, column storage and object storage. A column storage model may be configured to store data based on columns, not rows. A row storage model may be configured to store data based on rows, not columns.

Database 150 may contain one or more data items 152, which may be, without limitation, tables, business objects, datasets or data cubes of any known data form, including text, images, sound and/or video. In some embodiments, the data items 152 stored in database 150 may be detailed enterprise data relating to the operations of a company (e.g., an online transaction processing, or OLTP, database) and/or data extracted for analytical processing (e.g., an online analytical processing, or OLAP, database).

In some embodiments, database 150 may employ a database management system (DBMS) 140 to control the organization, storage, retrieval, security and integrity of the data items 152 contained in database 150. DBMS 140 may assist in providing logical structure and constraints to database 150, as well as creating simple database applications and/or reporting tools. DBMS 140 may exist as a set of computer programs residing within main memory 132 (e.g., in RAM) or within non-volatile memory 134 (e.g., on a hard disk). DBMS 140 may communicate with database 150 over the bus 115 of a computer 110 or across a network (e.g., a local area network or the Internet).

When one or more data items 152 from database 150 are needed by an application, a user and/or the application may submit a query 142 to DBMS 140, as shown in FIG. 1. DBMS 140 may include a query processor (see FIG. 3) for accepting query 142, deriving and executing a query plan and providing output data 144 to a computer 110. The term "query plan" as used herein may refer to an ordered set of steps executed by a DBMS to access or modify one or more data items within a database. The DBMS 140 may also include a storage engine (see FIG. 3) that reads the data items 152 from database 150 and writes them to the query processor for delivery as output data 144 to a computer 110. The query processor, according to some embodiments, may include translation functionality for translating query 142 into an internal format (e.g., relational algebra) and/or parsing capabilities for checking query syntax and verifying relationships between one or more data items 152 in database 150. The query processor of DBMS 140 may also include a query optimizer for determining the most efficient query plan for query 142. Query optimizers may be, without limitation, cost-based or syntax-based. A cost-based optimizer according to the present disclosure may estimate the cost (e.g., total elapsed time for answering a query) of a query by considering all possible combinations of query operators of a query which provide the same result and determining what combination of operators answer the query in the least amount of time. Cost-based optimizers may estimate these costs by tracking the number of disk blocks to read, CPU usage and/or the network communications. Syntax-based optimizers according to the present disclosure may create query plans for answering a query based on the exact syntax of the query and the order of the clauses within the query.

Query 142 may be drafted and submitted by a user through a query program or other software application located within memory 130 of computer 110 and providing a user interface for display to a user. Query programs may be limited to specific types of retrieval, such as displaying a customer account, or may employ general-purpose query language that allows any condition to be searched. A query language in accordance with the present disclosure may include without limitation any simplified computer language used to select records from a database. In some implementations, DBMS 140 may provide a query language, such as Structured Query Language (SQL), that allows users to interactively interrogate database 150. User interactions may involve typing in simple commands, using a predefined query menu or a query by example (QBE) functionality. Query programs may also include logical information requirements that users must satisfy before submitting a query. For example, a query program may require users to include in the query specific selection criteria and/or define what attributes are to be displayed as output.

Query 142 may also include one or more query operators that provide instructions as to how the query should be processed. Query operators may include, without limitation, SELECT to identify rows in a table, PROJECT to identify attributes in a table, JOIN to combine relations within one or more tables, AGGREGATE to return a single value for a set of retrieved rows of a table and/or INSERT, DELETE and UPDATE to modify one or more relations within a database. Query operators may be formatted as row query operators for processing data items stored in a row-formatted storage model or as column query operators for processing data items stored in a column-formatted storage model.

Figure 2B:
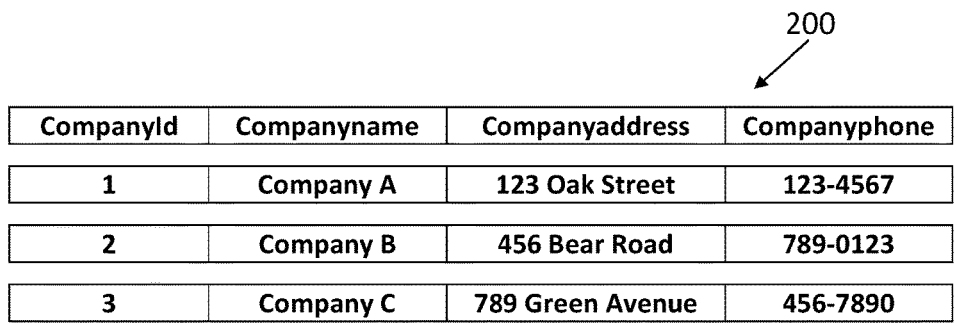
FIG. 2b shows an example of data stored in a row-formatted storage model according to some implementations of the present disclosure.

With reference to FIG. 1, upon receiving query 142, DBMS 140 may translate query 142 into an internal format, check for correct query syntax and verify relationships among one or more data items 152. DBMS 140 may also identify the number of query operators contained in query 142 and the format of each query operator (i.e., column or row). The DBMS 140 may then assess whether each query operator has a format that matches the format of the database storage model of each data item being processed for query 142. Referring to FIG. 2a, database 150 may contain a "company" database table 200 that stores company information by columns, thus requiring that the requested data items 152 be retrieved from database 150 column-by-column using column query operators. In FIG. 2b, database table 200 may store company information by rows, thus requiring that the requested data items 152 be retrieved from database 150 row-by-row using row query operators. Data items, according to some implementations of the present disclosure, may be stored in a single storage segmented by row and column pages or in multiple storages where each individual storage may store data items only by row or column.

In some cases, some or all of the query operators of query 142 may not be compatible with the format of the storage model of one or more of the data items being processed pursuant to query 142. For instance, query 142 may be a mixed query containing both row query operators and column query operators. Alternatively, query 142 may contain all row query operators and database 150 may store all relevant data items in a column storage model. Accordingly, FIG. 3 illustrates a DBMS 300 for handling a query 305 containing query operators that are formatted differently than the storage model format of data items being processed in response to query 305. DBMS 300 may include a query processor 310, storage engine 320, row-to-column format converter 330 and column-to-row format converter 340. The format converters 330 and 340 convert the format of intermediate data used by the query operators during the processing of query 305 to integrate row and column query operators within a single query plan. Using the format converters 330 and 340, row and column query operators can be freely connected and utilized regardless of the format of the database storage model of the data item(s) being processed for query 305. Each format converter 330 and 340 may also include one or more format conversion operators, such as a row-to-column conversion operator and/or a column-to-row conversion operator, for handling the actual data format conversion operation. Query processor 310, storage engine 320 and format converters 330 and 340 may be in communication with each other over a bus 325. Storage engine 320 may communicate with database 350 over communication mechanism 335.

As shown in FIG. 3, query 305 may be received by DBMS 300 and contain both row- and column-formatted query operators. More specifically, query 305 may request both transactional and analytical processing of data items stored in database 350. Upon receiving query 305, query processor 310 may recognize that query 305 contains both row- and column-formatted query operators and identify that at least one of the query operators is formatted differently than the storage model of one or more of the data items subject to processing for query 305. Query processor 310 may then call row-to-column format converter 330 or column-to-row format converter 340, depending on the storage model format of each data item being processed, to convert the format of data used by a query operator of a different format to a format that matches the format of the storage model of one or more data items being processed for query 305. That is, if a data item being processed in response to query 305 is stored within a column-formatted storage model of database 350, then query processor 310 may call the row-to-column format converter 330 to convert the format of data used by one or more row query operators of query 305 to a column format. Alternatively, if a data item is stored in a row-formatted storage model of database 350, then query processor 310 may call upon the column-to-row format converter 340 to convert the format of data used by one or more column query operators of query 305 to a row format. Thus, by using the row-to-column format converter 330 or column-to-row format converter 340, and more specifically row-to-column conversion operators or column-to-row conversion operators of format converters 330 and 340, respectively, all query operators of query 305 may be made compatible with the format of each database storage model of each data item being processed in database 350.

Accordingly, and more generally speaking, query processor 310 may be configured such that any query containing one or more query operators having a format different from the database storage model format of a data item being processed may be converted to a matching format by the format converters of the present disclosure. Thus, the input of a query operator may be any format (i.e., row format or column format) and by converting row-to-column and column-to-row, a query optimizer may choose a row or column query operator for a query operation. Each node in a query plan may therefore have multiple potential query operators so that there are many possible query plans derivable for a query.

Figure 4:
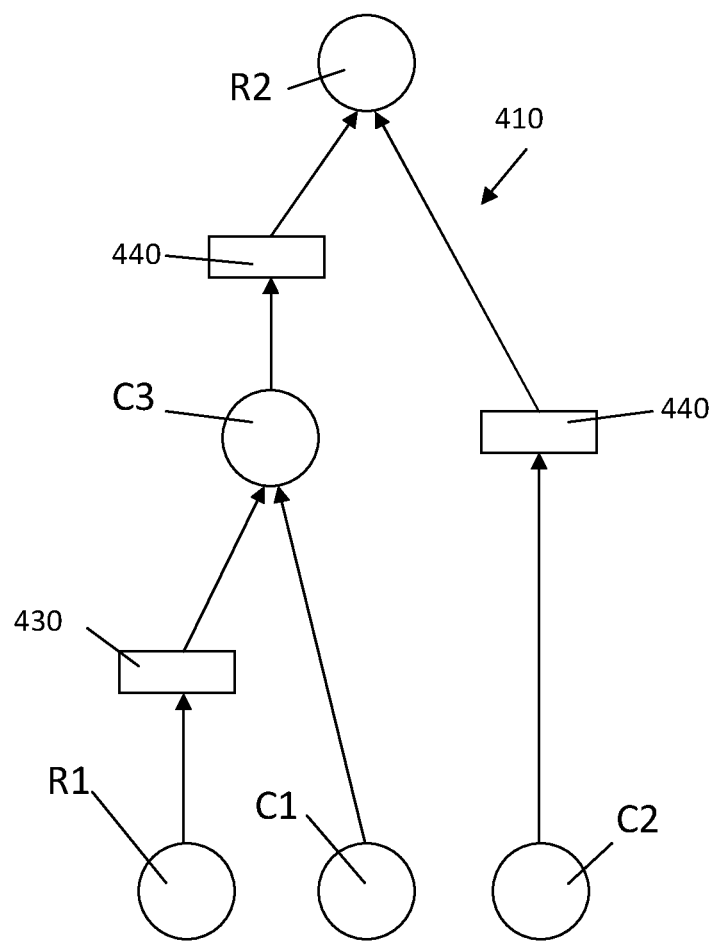
FIG. 4 shows a query plan containing format conversions according to some implementations of the present disclosure.

FIG. 4 shows an example query plan 410 of query 400 containing a plurality of format conversions performed by a row-to-column format converter 430 and column-to-row format converter 440 according to the present disclosure. The query plan 410 is shown in FIG. 4 as a tree of query plan nodes. The tree of nodes may be derived using a query optimizer in conjunction with the format converters 430 and 440. Query 400 contains one row query operator "R1" and two column query operators "C1" and "C2." In query plan 410, the format of data used by row query operator "R1" has been converted to a column format by row-to-column format converter 430 and joined with column query operator "C1" to form column query operator "C3." The format of data used by column query operators "C2" and "C3" have been converted to row formats by column-to-row format converter 440 and joined to form row query operator "R2." Row query operator "R2" may then perform a row query of an associated database table.

A DBMS, query processor and/or query optimizer may, in conjunction with one or both format converters of the present disclosure, derive numerous query plans for a single query by performing conversion operations on different query operators at varying nodes of a query plan. Additional query plan permutations may also be derived by varying the access paths (e.g., primary index access, secondary index access, full file scan, sequential, etc.) and relational table join algorithms (e.g., merge join, sort-merge join, hash join, product join, nested loop join, etc.). Using the format converters of the present disclosure thus advantageously increase the number of possible query plans that return proper results and, in turn, lead to the generation and selection of a more efficient query plan for executing a query.

Figure 5B:
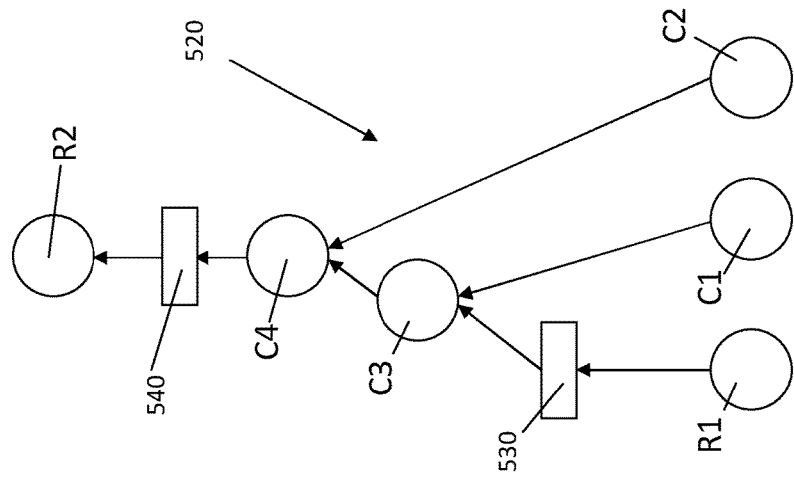
FIGS. 5a-5b show query plans containing format conversions according to some implementations of the present disclosure.
Figure 5A:
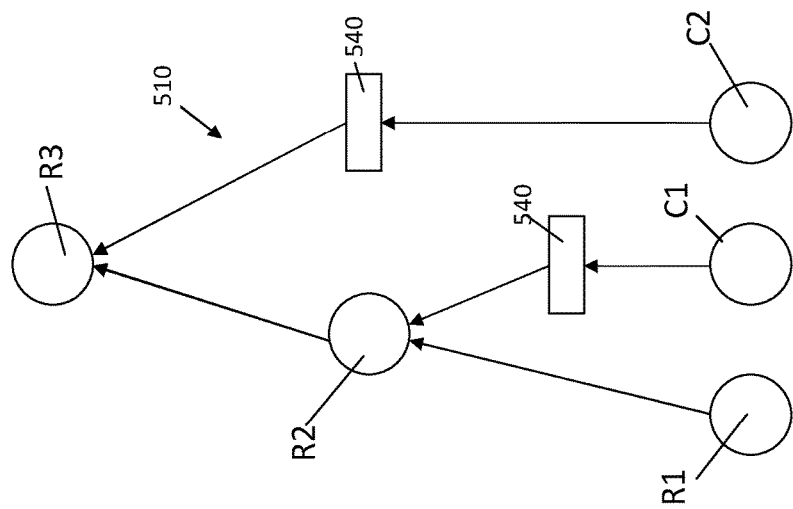

By way of example, FIGS. 5a and 5b illustrate two additional query plans based on the query 400 analyzed in FIG. 4. In query plan 510 of FIG. 5a, an format of data used by column query operator "C1" has been converted to a row format by column-to-row format converter 540 and joined with row query operator "R1" to form row query operator "R2." The format of data used by column query operator "C2" has also been converted to a row format by column-to-row format converter 540 and joined with row query operator "R2" to form row query operator "R3." Row query operator "R3" may then perform a row query of an associated database table. In query plan 520 of FIG. 5b, the format of data used by row query operator "R1" has been converted to a column query operator by row-to-column format converter 530 and joined with column query operator "C1" to form column query operator "C3." Column query operators "C2" and "C3" are then joined to form column query operator "C4". The format of data used by column query operator "C4" is then converted into a row operator "R2" by column-to-row format converter 540. Row query operator "R2" may then perform a row query of an associated database table.

Some implementations of the present disclosure may be directed to query optimization and, in particular, assessing all derived query plans of a query and selecting the optimal, or most efficient, query plan for execution. Query optimization may involve assessing which combination of query operators executes a given query in the least amount of time. In some embodiments, the query optimizer may employ cost-based optimization to determine the most efficient query plan. Cost-based optimizers may assign an estimated "cost" to each possible query plan and choose the plan with the smallest cost. "Cost" may be measured as total elapsed for answering a query and modeled based on estimated input/output size and processing time. Optimization criteria may include, without limitation, the number of disk blocks to read, CPU usage and communication costs for distributed data. Based on one or more of these criteria, the query optimizer may sum all query operators for each query plan and determine which query plan provides the lowest cost amount. The query optimization may assign a cost to each query operator in a bottom-up manner. The cost of a certain node in a query plan may be represented as a sum of the operational cost of the node and cost of the sub-tree located below the node. The cost of a sub-tree is defined as a sum of operational cost of all query operators in the sub-tree. In some implementations, assigning a cost and selecting a query plan may be complex due to the high number of different query plans that can be derived by the query optimizer in conjunction with the format converters of the present disclosure. Because many parent nodes may share a single sub-tree, a query optimizer may keep track of the sub-tree cost to avoid redundant cost calculations for a sub-tree. In some embodiments, the query optimizer may operate automatically without user input. In other embodiments, users may interact with the query optimizer to review a query plan. For example, because query optimizers are imperfect, database users and administrators may need to manually examine and tune a query plan produced by a query optimizer to get optimal performance.

In some implementations, format converters may be used for not only row- and/or column format but also for other storage models. For example, in some implementations, a DBMS may store its data in object format and process queries based on object format. If the object format is convertible to a row and/or column format, then a query optimizer may derive still more query plans for a single query using an object-to-row converter, row-to-object converter, object-to-column converter and/or column-to-object converter. By using the format converters, all possible mixed query plans are enumerated and the best plan may be chosen by the query optimizer.

In some implementations, the DBMS may generate a graphical representation of a query plan. In other implementations, the DBMS may allow a special mode to be set to cause a DBMS to return a textual description of the query plan. Another mechanism for retrieving the query plan may involve querying a virtual database table after executing the query.

Figure 6:
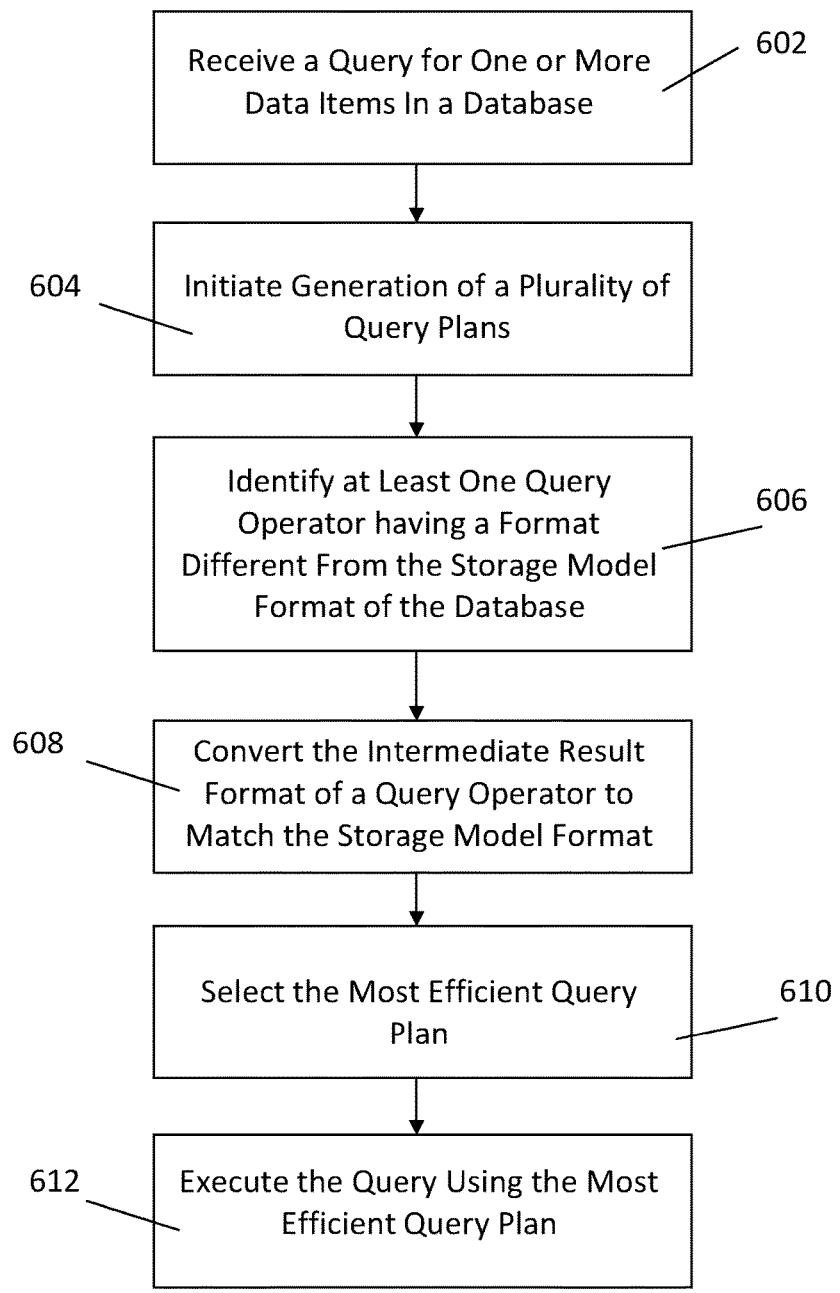
FIG. 6 shows a flow diagram depicting an example methodology for processing database queries formatted differently than the database storage model being queried.

FIG. 6 shows a flow diagram depicting an example methodology 600 for processing database queries having a format different from the format of the database storage model of the data items(s) being processed. At step 602, a query is received for one or more data items located in a database. As part of step 602, the query may be translated and/or parsed according to some implementations of the present disclosure. At step 604, a plurality of query plans may be generated by the DBMS of a database, a query processor and/or a query optimizer. Numerous query plans may be derived for a single query by altering which query operators are operated upon by the format converters and/or when such conversions occur in the query plan. In some embodiments, generating a plurality of query plans may include identifying at least one query operator having a format different from the storage model format of one or more data items of the database that are being processed for the query, as shown at step 606. Moreover, step 608 indicates that some implementations may generate query plans by converting the format of data used by a query operator to the same format as the storage model one or more data items of the database that are being processed for the query. At step 610, the most efficient query plan may be selected and thereafter executed, as shown at step 612.

The subject matter described herein may be embodied in systems, apparatus, methods, and/or articles depending on the desired configuration. Embodiments of the subject matter described herein may be realized in digital electronic circuitry, integrated circuitry, specially designed application specific integrated circuits (ASICs), computer hardware, firmware, software and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device and at least one output device.

These computer programs, which may also be referred to as programs, software, software applications, applications, components or code, may include without limitation machine instructions for a programmable processor. Embodiments of these computer programs may be implemented in a high-level procedural and/or object-oriented programming language and/or in assembly/machine language. As used herein, the term "machine-readable medium" refers to any computer program product, apparatus and/or device, including but not limited to magnetic discs, optical disks, memory and Programmable Logic Devices (PLDs), used to provide machine instructions and/or data to a programmable processor, including without limitation a machine-readable medium that receives machine instructions as a machine-readable signal. The term "machine-readable signal" may refer to any signal used to provide machine instructions and/or data to a programmable processor. The machine-readable medium may store machine instructions non-transitorily, as would a non-transient solid state memory, magnetic hard drive or any equivalent storage medium. The machine-readable medium may alternatively or additionally store machine instructions in a transient manner, as would, for example, a processor cache or other random access memory associated with one or more physical processor cores.

Processors suitable for the execution of a computer program include, by way of example, both general and special purpose microprocessors and any one or more processors of any kind of digital computer. Generally, a processor will receive instructions and data from read-only memory (ROM), random access memory (RAM) or both. The essential elements of a computer are a processor for executing instructions and one or more memory devices for storing instructions and data. Generally, a computer will also include, or be operatively coupled to receive data from and/or transfer data to one or more mass storage devices for storing data, e.g., magnetic, magneto-optical disks or optical disks. Media suitable for embodying computer program instructions and data include all forms of volatile (e.g., RAM) or non-volatile memory, including by way of example only semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein may be implemented on a computer having a display device, such as for example a cathode ray tube (CRT) or a liquid crystal display (LCD) monitor for displaying information to the user. The computer may also have a keyboard and/or pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback or tactile feedback. Similarly, input from the user to the computer may be received in any form, including but not limited to visual, auditory or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user may interact with an implementation of the subject matter described herein, or any combination of such back-end, middleware, or front-end components. The components of the system may be interconnected by any form or medium of digital data communication, such as for example a communication network. Examples of communication networks include, but are not limited to, a local area network ("LAN"), a wide area network ("WAN") and/or the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The embodiments set forth in the foregoing description do not represent all embodiments consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the embodiments described above may be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other embodiments may be within the scope of the appended claims.

What is claimed is:

1. A computer program product, tangibly embodied in a non-transitory machine-readable medium, the computer program product containing instructions to configure a data processing apparatus to perform operations comprising:
   receiving a query for one or more data items stored in a database, the query being associated with a query plan; and
   in response to a query operator using data having a format different from a storage model format of the one or more data items stored in the database, converting the format of the data used by the query operator to another format that matches the storage model format of the one or more data items, wherein a difference between the format and the storage model format before the converting is one of the following: the format of the data is a row-format and the storage model format is a column-format or the format of the data is the column-format and the storage model is the row-format.

2. The computer program product of claim 1, wherein the converting further comprises:
   converting the format of a row query operator to the column-format.

3. The computer program product of claim 1, wherein the converting further comprises:
   converting the format of a column query operator to the row-format.

4. The computer program product of claim 1, wherein the query plan is selected from a plurality of query plans for the query.

5. The computer program product of claim 4, further comprising:
   assessing which query plan of the plurality of query plans answers the query in a least amount of time.

6. The computer program product of claim 5, wherein the assessing includes using cost-based optimization to determine a most efficient query plan.

7. The computer program product of claim 1, further comprising:
   generating a plurality of query plans;
   selecting a most efficient query plan of the plurality of query plans; and
   executing the query using the most efficient query plan.

8. A computer-implemented method comprising:
   receiving a query for one or more data items stored in a database, the query being associated with a query plan; and
   in response to a query operator using data having a format different from a storage model format of the one or more data items stored in the database, converting the format of the data used by the query operator to another format that matches the storage model format of the one or more data items, wherein a difference between the format and the storage model format before the converting is one of the following: the format of the data is a row-format and the storage model format is a column-format or the format of the data is the column-format and the storage model format is the row-format.

9. The computer-implemented method of claim 8, wherein the converting further comprises:
   converting the format of a row query operator to the column format.

10. The computer-implemented method of claim 8, wherein the converting further comprises:
    converting the format of a column query operator to the row-format.

11. The computer-implemented method of claim 8, wherein the query plan is selected from a plurality of query plans for the query.

12. The computer-implemented method of claim 11, further comprising assessing which query plan of the plurality of query plans answers the query in a least amount of time.

13. The computer-implemented method of claim 12, wherein the assessing includes using cost-based optimization to determine a most efficient query plan.

14. The computer-implemented method of claim 8, further comprising:
    generating a plurality of query plans;
    selecting a most efficient query plan of the plurality of query plans; and
    executing the query using the most efficient query plan.

15. A system comprising:
    at least one processor; and
    at least one memory, the at least one processor and the at least one memory configured to perform operations comprising:
      receiving a query for one or more data items stored in a database, the query being associated with a query plan; and
      in response to a query operator using data having a format different from a storage model format of the one or more data items stored in the database, converting the format of the data used by the query operator to another format that matches the storage model format of the one or more data items, wherein a difference between the format and the storage model format before the converting is one of the following: the format of the data is a row-format and the storage model format is a column-format or the format of the data is the column-format and the storage model format is the row-format.

16. The system of claim 15, further comprising assessing which query plan of the plurality of query plans answers the query in a least amount of time.

17. The system of claim 16, wherein the assessing include using a cost-based optimization to determine a most efficient query plan.

18. The system of claim 15, wherein the converting further comprises:
    converting the format of a row query operator to the column-format.

19. The system of claim 15, wherein the converting further comprises:
    converting the format of a column query operator to the row-format.

* * * * *